(12) United States Patent
Roussel et al.

(10) Patent No.: US 9,321,249 B2
(45) Date of Patent: Apr. 26, 2016

(54) CALCIUM CARBONATE BARRIER FILMS AND USES THEREOF

(75) Inventors: Michael D. Roussel, Rutland, VT (US);
James E. Cara, Fulshear, TX (US);
Allen R. Guy, West Columbia, TX (US);
Lane G. Shaw, Alpharetta, GA (US)

(73) Assignee: Omya International AG, Oftringen (CH)

( * ) Notice: Subject to any disclaimer, the term of this patent is extended or adjusted under 35 U.S.C. 154(b) by 1072 days.

(21) Appl. No.: 12/086,651

(22) PCT Filed: Nov. 20, 2006

(86) PCT No.: PCT/US2006/045179
§ 371 (c)(1),
(2), (4) Date: Apr. 6, 2009

(87) PCT Pub. No.: WO2007/078454
PCT Pub. Date: Jul. 12, 2007

(65) Prior Publication Data
US 2009/0324979 A1  Dec. 31, 2009

Related U.S. Application Data

(60) Provisional application No. 60/755,659, filed on Dec. 29, 2005.

(51) Int. Cl.
| B32B 27/08 | (2006.01) |
| B32B 27/32 | (2006.01) |
| B32B 7/02  | (2006.01) |
| B32B 27/20 | (2006.01) |
| C08J 5/18  | (2006.01) |
| B32B 27/30 | (2006.01) |

(52) U.S. Cl.
CPC . *B32B 27/32* (2013.01); *B32B 7/02* (2013.01); *B32B 27/08* (2013.01); *B32B 27/20* (2013.01); *B32B 27/306* (2013.01); *B32B 27/308* (2013.01); *C08J 5/18* (2013.01); *B32B 2250/24* (2013.01); *B32B 2264/104* (2013.01); *B32B 2270/00* (2013.01); *B32B 2307/31* (2013.01); *B32B 2307/72* (2013.01); *B32B 2307/7246* (2013.01); *B32B 2439/70* (2013.01); *B32B 2439/80* (2013.01); *C08J 2323/04* (2013.01); *Y10T 428/31938* (2015.04)

(58) Field of Classification Search
USPC .................................. 428/515, 516
See application file for complete search history.

(56) References Cited

U.S. PATENT DOCUMENTS

| 4,183,893 A | 1/1980 | Eastwood et al. |
| 4,870,122 A | 9/1989 | Lu |
| 5,236,963 A | 8/1993 | Jacoby et al. |
| 5,972,444 A | 10/1999 | Patel et al. |
| 6,106,956 A | 8/2000 | Heyn et al. |
| 6,391,411 B1 | 5/2002 | Duckwall, Jr. et al. |
| 6,569,527 B1 | 5/2003 | Calhoun et al. |
| 6,773,818 B2 * | 8/2004 | Cretekos et al. ............. 428/461 |
| 7,026,391 B2 * | 4/2006 | Scheibelhoffer et al. ..... 524/515 |
| 2002/0022084 A1 | 2/2002 | Calhoun et al. |
| 2002/0042490 A1 * | 4/2002 | McLeod et al. ............ 526/348.1 |
| 2002/0182390 A1 * | 12/2002 | Migliorini et al. ............ 428/216 |
| 2003/0030174 A1 | 2/2003 | Gray et al. |
| 2003/0039851 A1 * | 2/2003 | Hale et al. ................... 428/480 |
| 2003/0055175 A1 * | 3/2003 | Klosiewicz ................. 525/240 |
| 2003/0162010 A1 | 8/2003 | Forte |
| 2004/0105942 A1 | 6/2004 | Cable |
| 2004/0224175 A1 | 11/2004 | Henderson |
| 2005/0037162 A1 * | 2/2005 | Adams ....................... 428/34.2 |
| 2005/0100753 A1 * | 5/2005 | Reese et al. ................. 428/516 |
| 2005/0101206 A1 | 5/2005 | McCormack et al. |
| 2005/0202213 A1 | 9/2005 | Yanai |
| 2006/0286367 A1 * | 12/2006 | Fish et al. ................... 428/330 |
| 2008/0274245 A1 * | 11/2008 | Lee et al. .................... 426/394 |
| 2009/0110942 A1 * | 4/2009 | Henderson-Rutgers et al. ................... 428/483 |

FOREIGN PATENT DOCUMENTS

| EP | 1375579 A1 | 1/2004 |
| EP | 1482005 A2 | 12/2004 |
| GB | 2413331 A | 10/2005 |
| JP | 04325243 A | 11/1992 |
| JP | 06091829 A | 4/1994 |
| JP | 07009642 | 1/1995 |
| JP | 2001072890 A | 3/2001 |
| WO | 0210275 A2 | 2/2002 |
| WO | 03020513 A1 | 3/2003 |
| WO | 03031134 A1 | 4/2003 |
| WO | WO 2004/087574 A1 | 10/2004 |
| WO | 2005014283 A1 | 2/2005 |

OTHER PUBLICATIONS

"PCT Notification Concerning Transmittal of International Preliminary Report on Patentability" dated Jul. 10, 2008 issued by the International Bureau of WIPO in connection with PCT International Patent Applicaiton No. PCT/US2006/045179, 10 pages.

Extended European Search Report dated May 4, 2012, for corresponding European Application No. EP 06 838 255.5.

Office Action dated Jul. 30, 2013 for Japanese Application No. 2008-548516.

* cited by examiner

*Primary Examiner* — Ronak Patel

(74) *Attorney, Agent, or Firm* — Amster, Rothstein & Ebenstein LLP

(57) ABSTRACT

The present invention provides polyolefin films comprising calcium carbonate that have a reduced moisture vapor transmission rate, methods of making the films, and packaging materials comprising the films.

30 Claims, No Drawings

CALCIUM CARBONATE BARRIER FILMS AND USES THEREOF

CROSS REFERENCE TO RELATED APPLICATIONS

This application is a national stage entry under 35 U.S.C. §371 of PCT International Patent Application No. PCT/US2006/045179, filed Nov. 20, 2006, and claims priority to U.S. Provisional Patent Application No. 60/755,659, filed Dec. 29, 2005, the contents of which are hereby incorporated by reference in their entirety.

FIELD OF THE INVENTION

This invention is directed toward a film structure comprising polyolefin and calcium carbonate that has reduced moisture vapor transmission rate and is suitable for packaging moisture-sensitive materials such as dry foods, animal feed, and pharmaceutical products.

BACKGROUND OF THE INVENTION

Throughout this application various publications are referred to in parenthesis. Full citations for these references may be found at the end of the specification immediately preceding the claims. The disclosures of these publications are hereby incorporated by reference in their entireties into the subject application to more fully describe the art to which the subject application pertains.

For packaging of dry foods and other moisture sensitive materials, it is desirable to have a barrier package that prevents the ingress of moisture vapor and thus keeps the contents from becoming soggy. The packaging should allow the food material to be containerized into a paperboard box for shelf display and ease of handling.

Polymer films have been developed with the objective of increasing, rather than decreasing, moisture vapor transmission through the film (e.g., PCT International Publication Nos. WO 02/10275 A2, 03/020513 A1 and WO 03/031134 A1). In contrast, reduced water vapor transmission rate (WVTR) has been achieved using a laminated paperboard substrate, which is suitable as a container for beverages (U.S. Patent Application Publication No. 2004/0105942). Reduced WVTRs have also been obtained by orientation of high density polyethylene (HDPE) films (U.S. Pat. Nos. 4,183,893, 4,870,122, 6,391,411).

While there are different technologies that provide a moisture vapor barrier in packaging films, there is a need for improved barrier films for packaging dry foods and other moisture-sensitive material where the film is both moisture resistant and economical.

SUMMARY OF THE INVENTION

The present invention satisfies this need by using calcium carbonate ($CaCO_3$) to provide improved polyolefin barrier films. The barrier film affords good moisture vapor resistance, heat sealing and handling properties. The barrier structure is comprised of a calcium carbonate containing polyolefin film in a single or multiple layer film construction. In structures having a plurality of film barrier layers comprising $CaCO_3$, the $CaCO_3$ provides in each of the multiple barrier layers a reduced rate of moisture vapor transmission through the respective barrier layers. The films are especially useful in food packaging, animal feed packaging, pharmaceutical packaging, and packaging of other moisture-sensitive materials.

Additional objects of the invention will be apparent from the description which follows.

DETAILED DESCRIPTION OF THE INVENTION

The present invention is directed to films comprising polyolefin and calcium carbonate, where the films have a reduced moisture vapor transmission rate (MVTR).

Polyolefins are a family of polymers made from olefin monomers. Examples include polyethylene (PE), polypropylene and polyisoprene. PE can be high density PE (HDPE, density $\geq 0.95$ gm/cm$^3$), medium density PE (MDPE, density 0.934 to <0.95 gm/cm$^3$) and low density PE (LDPE, density <0.934 gm/cm$^3$). LDPE can be linear LDPE (LLDPE). HDPE is a preferred polyolefin. Medium molecular weight HDPE (MMW-HDPE) is a preferred HDPE.

As used herein, medium molecular weight (MMW) polymers have the following weight distributions: number average molecular weight (Mn) of 6,000 to 13,000, weight average molecular weight (Mw) of 50,000 to 120,000, and Z average molecular weight (Mz) of 175,000 to 500,000. Preferably, the number average molecular weight (Mn) is 8,000 to 11,000. Preferably, the weight average molecular weight (Mw) is 70,000 to 100,000. Preferably, the Z average molecular weight (Mz) is 250,000 to 400,000.

A preferred film comprises a) a polyolefin base resin and b) a polyolefin carrier resin admixed with calcium carbonate ($CaCO_3$), wherein the $CaCO_3$ and the carrier resin are present in a ratio of 15/85 to 80/20 by weight. Preferably, the base resin and the carrier resin are different resins. The base resin and the carrier resin may differ, for example, in molecular weight, density, melt index, and/or polydispersity index. The polydispersity index is the weight average molecular weight (Mw) divided by the number average molecular weight (Mn). The carrier resin may have a Mw/Mn ratio of, e.g., 6.82 and the base resin may have a ratio of, e.g., 9.35. The carrier resin and base resin may differ in Z average molecular weight (Mz) where, e.g., the carrier resin has a Mz of 203,000 and the base resin has a Mz of 332,000.

Another preferred film comprises polyolefin and calcium carbonate ($CaCO_3$), wherein the film comprises: a) a polyolefin base resin having a melt index of 0.05-2.0 dg/min and a density of 0.958-0.963 g/cm$^3$; b) a polyolefin carrier resin for $CaCO_3$, wherein the carrier resin has a melt index of 4-10 dg/min and a density of 0.958-0.963 g/cm$^3$; and c) $CaCO_3$; wherein $CaCO_3$ is present in the film in a total concentration of 5%-35% by weight.

An additional preferred film comprises: a) a high density polyethylene (HDPE) base resin, wherein the HDPE base resin has a melt index of 0.05-2.0 dg/min and a density of 0.958-0.963 g/cm$^3$; b) a HDPE carrier resin for calcium carbonate ($CaCO_3$), wherein the HDPE carrier resin has a melt index of 4-10 dg/min and a density of 0.958-0.963 g/cm$^3$; and c) $CaCO_3$, wherein the $CaCO_3$ has a median particle size of 0.7-2.5 μm, a top cut d98 of 4-15 μm, a surface area of 3.3-10.0 m$^2$/g, and a total concentration in the film of 5-35% by weight, wherein the $CaCO_3$ has been treated with a surface treatment agent at a treatment level of 0.3-2.3% by weight, and wherein the $CaCO_3$ and the HDPE carrier resin are present in a ratio of 15/85 to 80/20 by weight. Preferably, the $CaCO_3$ has been treated with the surface treatment agent at a treatment level of 1.5-3 mg surface treatment agent/m$^2$ of $CaCO_3$. Preferably, the $CaCO_3$ has been wet ground and/or dry ground prior to incorporation of $CaCO_3$ in the film. Wet grinding can be carried out in the absence of a grinding aid or in the presence of a grinding aid comprising, e.g., a salt of polyacrylic acid and/or a salt of a copolymer of acrylic acid. Preferably, the calcium carbonate is dried after grinding. $CaCO_3$ can be treated with the surface treatment agent before and/or during and/or after grinding the $CaCO_3$.

Another preferred film comprises a) a high density polyethylene (HDPE) having a density of 0.958-0.963 g/cm$^3$, and b) calcium carbonate ($CaCO_3$) having a median particle size of 0.7-2.5 µm, a top cut d98 of 4-15 µm, a surface area of 3.3-10.0 m$^2$/g, and a total concentration in the film of 5-35% by weight.

$CaCO_3$ and carrier resin can be present in the films in a ratio of 15/85 to 80/20 by weight, for example 40/60 to 80/20 by weight. Preferred ranges of $CaCO_3$/carrier resin ratios are 15/85 to less than or equal to (≤) 60/40 by weight, for example 40/60 to ≤60/40 by weight and 45/55 to 55/45 by weight. In a most preferred film, $CaCO_3$ and carrier resin are present in a ratio of 50/50 by weight.

$CaCO_3$ can be present in the films in a total concentration, for example, of 5%-35% by weight, preferably 20%-30% by weight, and more preferably 25% by weight. These concentrations apply both to single layer films and to multi layer films, where some layers may not contain any $CaCO_3$ or where different layers may contain different amounts of $CaCO_3$.

The base resin of the present invention can have a melt index, for example, of 0.05-2.0 dg/min, preferably 1 dg/min. The base resin can have a density of 0.958-0.963 g/cm$^3$, preferably 0.962 g/cm$^3$. Preferably, the base resin is a high density polyethylene (HDPE). Preferably, the HDPE is a medium molecular weight high density polyethylene (MMW-HDPE). Base resins such as MMW-HDPE resins can be produced via Zigler-Natta catalyst chemistries and generally fall into the range of 0.85 to 1.5 dg/min melt index, and densities 0.9580 g/cm$^3$ and higher to the maximum limits for polyethylene manufactured without co-monomers. A preferred base resin is a resin having the properties of Resin A (see Table 1, below). In traditional applications, films can be made by extruding this material, or like material in its neat form (without any other additives or masterbatches). As used herein, this material is referred to as a "base resin."

The carrier resin for $CaCO_3$ can have a melt index of 4-10 dg/min, preferably 6.5-8.0 dg/min, and most preferably 6.5 dg/min. The carrier resin can have a density, for example, of 0.958-0.963 g/cm$^3$, preferably 0.962 g/cm$^3$. Preferably, the carrier resin is a high density polyethylene (HDPE). Preferably, the HDPE is a medium molecular weight high density polyethylene (MMW-HDPE).

The $CaCO_3$ in the films can have a median particle size of 0.7-2.5 µm, preferably 1.4-2.0 µm, and more preferably 1.4 µm. The $CaCO_3$ can have a top cut d98 of 4-15 µm, preferably 8-10 µm, and more preferably 8 µm. Top cut d98 refers to the average diameter of calcium carbonate particles in the 98$^{th}$ mass percentile. The $CaCO_3$ can have a surface area of 3.3-10.0 m$^2$/g, preferably 3.3-5.5 m$^2$/g, and more preferably 5.5 m$^2$/g.

The calcium carbonate may be a natural ground calcium carbonate such as, for example, ground marble, limestone or chalk, and/or a precipitated calcium carbonate (e.g., aragonite, waterite or calcite). Preferably, the calcium carbonate is a natural ground calcium carbonate. Calcium carbonate can be dry ground and/or wet ground. Wet grinding refers to grinding the calcium carbonate in a liquid medium. Wet grinding may be carried out in the absence of a grinding aid or in the presence of a grinding aid. One or more grinding aid agents can be included, such as, e.g., sodium polyacrylate, a salt of polyacrylic acid, and/or a salt of a copolymer of acrylic acid. For example, calcium carbonate can be derived from marble, which is finely ground in a high solids aqueous media using dispersion aids to keep the particles suspended during the process. The material is then dewatered, dried, treated and deagglomerated to again finely divide the individual particles. Drying may take place using any suitable drying equipment and can, for example, include thermal drying and/or drying at reduced pressure using equipment such as an oven, a spray drier (such a spray drier sold by Niro and/or Nara), and/or a drying in a vacuum chamber. Drying may be batch wise and/or continuous.

Surface treatment agents can be added to the $CaCO_3$ to facilitate dispersion of $CaCO_3$ in the resin. Surface treatment agents can be, for example, one or more fatty acids having 8 to 24 carbon atoms. These agents include, e.g., one or more of arachidic acid, behenic acid, capric acid, cerotic acid, isostearic acid, lauric acid, myristic acid, montanic acid, palmitic acid and stearic acid. Preferred treatment agents include stearic acid and a blend of stearic acid and palmitic acid. The fatty acid may be from a vegetable source. The fatty acid may be kosher. The $CaCO_3$ can be treated with the surface treatment agent at a treatment level of 0.3-2.3% by weight treatment agent and 97.7-99.7% by weight $CaCO_3$. Preferably, the treatment level is 0.8-1.1% by weight treatment agent (89.9%-99.2% by weight $CaCO_3$), and more preferably 1.1% by weight treatment agent (89.9% by weight $CaCO_3$). Preferably, the treatment level is 1.5-3.0 mg of surface treatment agent per m$^2$ of $CaCO_3$, more preferably 2-2.4 mg agent/m$^2$ $CaCO_3$. For ground $CaCO_3$, the $CaCO_3$ can be treated with the surface treatment agent before and/or during and/or after grinding the $CaCO_3$.

Construction of moisture vapor barrier packaging films are either mono or multi layer. The present invention is also directed to multilayer films that comprise any of the polyolefin and calcium carbonate films disclosed herein. Multi layer films generally use an inner contact layer to promote sealing, where the inner contact layer comprises one or more of ethylene vinyl acetate (EVA), ethylene ethyl acetate (EEA), and ethylene acrylic acid (EAA). Vinyl acetate content in this contact layer resin is typically about 18% by weight. Depending upon the extruder configuration in a coextrusion process, there may be anywhere from 2 to 7 or more layers.

A preferred multilayer film comprises an inner layer comprising one or more of ethylene vinyl acetate (EVA), ethylene ethyl acetate (EEA), and ethylene acrylic acid (EAA), a core layer comprising polyolefin and calcium carbonate ($CaCO_3$), and an outer layer comprising polyolefin and calcium carbonate ($CaCO_3$). As used herein, the terms "inner," "core" and "outer" are used to describe and clarify the relative position of various layers in a multiple layer film construction. The term "inner" refers to the surface of a packaging film that comes in contact with the contained product; whereas, the term "outer" refers to the outside of the packaging film that is in contact with the surrounding atmosphere. "Core" describes the layer effectively sandwiched between the inner and outer layers. The multilayer film can have a weight distribution by layer, for example, of 25-35% outer layer, 50-60% core layer, and 10-20% inner layer, e.g. 30% outer layer, 55% core layer, and 15% inner layer.

The concentration of ethylene vinyl acetate (EVA), ethylene ethyl acetate (EEA), or ethylene acrylic acid (EAA) in the film layer containing EVA, EEA or EAA can be, for example, 15-20% by weight. The ethylene vinyl acetate (EVA) can have a density, for example, of 0.95 g/cm$^3$. The ethylene vinyl acetate (EVA) can have a melt index, for example, of 1.5 dg/min.

Another multilayer film comprises at least a first layer containing one or more of ethylene vinyl acetate (EVA), ethylene ethyl acetate (EEA), and ethylene acrylic acid (EAA) and at least a second layer containing polyolefin and calcium carbonate ($CaCO_3$), wherein $CaCO_3$ is present in the multilayer film in a total concentration of 5%-35% by weight, preferably 20%-30% by weight, and more preferably 25% by weight.

The invention also provides methods of making masterbatch compositions for preparing the films, where the methods comprise mixing any of the $CaCO_3$ and polyolefin carrier resins disclosed herein. By itself, calcium carbonate is a finely divided powder and can be a difficult to handle, meter and feed to an extrusion system. To facilitate the introduction of finely ground mineral to the extrusion process, a pellet masterbatch can be produced from select polyolefin (e.g., polyethylene) resin(s) and calcium carbonate(s). Pellet masterbatches contain calcium carbonate and the "carrier resin" to bind the pellet. A small amount of antioxidant is typically added to prevent polymer degradation.

A preferred method comprises mixing $CaCO_3$ with a polyolefin carrier resin, wherein the $CaCO_3$ and the carrier resin are present in a ratio of 15/85 to 80/20 by weight, more preferably 15/85 to ≤60/40 by weight. Another preferred method comprises mixing $CaCO_3$ with a HDPE carrier resin, wherein the $CaCO_3$ and the HDPE carrier resin are present in a ratio of 15/85 to 80/20 by weight, more preferably 15/85 to ≤60/40 by weight. The methods can include forming the masterbatch compositions into pellets.

The invention provides masterbatch compositions prepared by any of the methods disclosed herein. A preferred masterbatch composition, for example, comprises 50% by weight calcium carbonate of 1.4 μm median diameter particle size, a top cut particle size d98 of 8.0 μm, with a 1.1% by weight stearic acid surface treatment, in a 50% by weight high density polyethylene (HDPE) carrier resin of 0.962 g/cm$^3$ density and 6.5 dg/min melt index. A treatment level of 1.1% by weight stearic acid means 1.1% by weight stearic acid and 98.9% by weight calcium carbonate.

The invention further provides methods of making a film comprising polyolefin and calcium carbonate ($CaCO_3$), wherein the method comprises blending any of the masterbatch composition disclosed herein with any of the polyolefin base resins disclosed herein. The masterbatch composition and the base resin can each be in the form of pellets, which can be blended in a desired ratio. The blended pellets are melted and then extruded or stretched into an intermediate film, which can then stretched to form a final film.

Selection of the carrier resin is critical in determining the resultant physical properties of the film, especially at higher $CaCO_3$ loading levels. As disclosed in the present invention, it is advantageous to use a carrier resin that is different than the base resin in order to obtain either better production efficiencies or quality of the masterbatch, and/or desired physical properties of the resultant extrudates. Preferred carrier resins are polyethylenes of higher melt index (lower molecular weight), which work to improve MVTR barrier properties. A preferred carrier resin is one having the properties of Resin B (see Table 1, below).

An alternative to using a pellet masterbatch system to deliver calcium is using a fully formulated resin. In this case, a resin would be compounded with the desired amount of calcium carbonate and pelleted. The pellets would then be directly added to an extruder to produce an extrudate of the desired type.

The film making methods can include coextruding a film layer comprising polyolefin and calcium carbonate with a film layer comprising one or more of ethylene vinyl acetate (EVA), ethylene ethyl acetate (EEA), and ethylene acrylic acid (EAA). For example, an inner film layer comprising one or more of ethylene vinyl acetate (EVA), ethylene ethyl acetate (EEA), and ethylene acrylic acid (EAA) is coextruded with a core film layer comprising polyolefin and calcium carbonate ($CaCO_3$) and an outer film layer comprising polyolefin and calcium carbonate ($CaCO_3$).

Coextrusion as a polymer materials processing technique uses multiple extruders to feed a die block to combine multiple polymer flow streams prior to shaping the combined melt in a die. The advantage of using coextrusion is the ability to form well bonded structures from multiple materials of varying properties in a single step. The method of production by coextrusion according to this invention may, for example, be carried out by leading two or more kinds of olefin resins, plasticized by means of two or more extruders, into a common die and causing them to come into contact inside or at the opening of the die to thereby form in the first step a film with two or more layers.

Preferably, the film is processed at a blow up ratio (BUR) of from 1.6:1 to 2.2:1, more preferably 1.6:1. Preferably, the film is processed at a mil gauge of 2.0-3.0, more preferably 2.0-2.5.

The invention provides films made by any of the methods disclosed herein.

Preferred calcium carbonate-polyolefin films of the present invention have a reduced moisture vapor transmission rate (MVTR) in comparison to the film in the absence of $CaCO_3$. As used herein, moisture vapor transmission rate (MVTR) and water vapor transmission rate (WVTR) are used interchangeably. Preferably, the MVTR is reduced by 10-30% compared to the MVTR of the film in the absence of $CaCO_3$. More preferably, the MVTR is reduced by 20-30% compared to the MVTR of the film in the absence of $CaCO_3$. Even more preferably, the MVTR is reduced by 25-30% compared to the MVTR of the film in the absence of $CaCO_3$.

The films can have a moisture vapor transmission rate (MVTR) of, for example, 0.213-0.230 g water vapor-mil/100 in$^2$ of film/day, more preferably 0.213 g water vapor-mil/100 in$^2$ of film/day, at 37.5° C. and 100% relative humidity. As used herein for values for MVTR, the term "mil" refers to the thickness of the film, where 1 mil=1/1,000 of an inch of film thickness.

The invention provides packaging films comprising any of the films disclosed herein. The films are especially useful in food packaging, animal feed packaging, pharmaceutical packaging, and packaging of other moisture-sensitive materials. The food products can be dry food products, such as cereal or crackers. The reduced MVTR of the films disclosed herein helps prevent the ingress of moisture vapor and thus keeps the food contents from becoming soggy. The film packaging allows the food material to be containerized into a paperboard box for shelf display and ease of handling. The films will enable an extended product shelf life in a cost effective package that meets multiple performance needs. The films described herein can serve as free standing films, which are not laminated to a support such as a paperboard substrate or other rigid support.

The present invention is illustrated in the following Experimental Details section, which is set forth to aid in the understanding of the invention, and should not be construed to limit in any way the scope of the invention as defined in the claims that follow thereafter.

EXPERIMENTAL DETAILS

Overview

To illustrate the properties of a polyolefin film having a calcium carbonate additive, a comparative study of an extruded 3 layer MMW-HDPE film was compared to that of one with similar construction incorporating 20-30% by weight calcium carbonate in the total film construction. Calcium carbonate was contained in only the outer and core layers and not in the inner layer. The calcium carbonate was incorporated as a calcium carbonate masterbatch.

A three layer film was coextruded using a MMW-HDPE base resin (Resin A in Table 1) having a density of 0.962 g/cm$^3$ and a 1.0 dg/min melt index for the outer and core layers, with an inner layer of ethylene vinyl acetate (EVA) (Dupont Evlax® 3169Z) with a density of 0.95 g/cm$^3$, 1.5 dg/min melt index and 18% by weight vinyl acetate co-monomer. The purpose of the inner EVA layer is to provide enhanced seal performance by allowing lower seal initiation temperatures, and shorter seal dwell time in the bag making process.

The coextrusion layer distribution consisted of 30% outer layer, 55% core layer and 15% inner EVA layer by weight. Total mineral load was targeted at 25% by weight of calcium carbonate in most of the films (see Table 4, below); therefore, 29.5% by weight calcium carbonate was necessary in the outer and core layers to compose the effective amount. Correspondingly, the additive feed system was targeted at 58.8% by weight concentrate masterbatch and 41.2% by weight MMW-HDPE (Resin A in Table 1) for the outer and core layer extruders to obtain the 29.5% necessary in these respective layers to hit the effective amount of 25% by weight in the films.

The resultant films were evaluated for physical performance including moisture vapor transmission rate (MVTR) using a Mocon PERMATRAN-W® Model 3/33. Comparing standard films without calcium carbonate at 3.0 mil gauge extruded at 1.6 blow up ratio against the films extruded at lower gauge (2.5 mils) using 25% by weight calcium carbonate extruded at similar blow up ratios, resulted in improvements in MVTR as presented below.

Having calcium carbonate present in the outer film layer contributes to a surface roughening effect, which effectively makes the films easier to handle in secondary operation bag making equipment, and allows for easier and improved printability and print register. Also, this surface modification by addition of calcium carbonate has been shown to lower the coefficient of friction.

While a preferred embodiment is made in reference to a co-extruded polyolefin film having about 25% weight loading of calcium carbonate, it is recognized that other relative percentages of calcium carbonate in monolayer or various multi layer construction forms may be utilized. By way of example, changing the film construction layer distribution or the location of the calcium carbonate (calcium carbonate in the core layer only) would provide a structure having properties similar to the exemplary embodiment set forth.

Details of Experimental Work

Measurements of melt index, density and molecular weight: Melt index was measured using ASTM standard method D1238-04, Standard Test Method for Melt Flow Rates of Thermoplastics by Extrusion Plastometer. This standard can be found in the Annual Book of ASTM Standards 2005, Section Eight—Plastics Volume 8.01. Density was measured using ASTM standard method D1501-03, Standard Test Method for Density of Plastics by the Density-Gradient Technique. This standard can be found in the Annual Book of ASTM Standards 2005, Section Eight—Plastics Volume 8.01. Molecular weight was determined using a Waters gel permeation chromatograph. The pump used was a 150 C operated at a flow rate of 1.00 mL/min on an injection volume of 250 μL at 135° C. The sample was prepared using 12 mg of polyethylene sample dissolved in 4 mL of 1,2,4-Trichlorobenzene. The columns used were Waters Styragel HT3, HT4, HT5 and HT6E. Number average molecular weight (Mn), weight average molecular weight (Mw) and Z average molecular weight (Mz) are calculated as follows.

Number average molecular weight (Mn) is the total weight of all the polymer molecules in a sample, divided by the total number of polymer molecules in the sample. Mn is mathematically expressed as $$Mn = \frac{\sum_{i=1}^{\infty} MiNi}{\sum_{i=1}^{\infty} Ni}$$

where Ni is equivalent to the particular number of molecules at a given molecular mass and Mi is mole weight of the respective molecules.

Weight average molecular weight (Mw) is the next higher molecular weight mathematically expressed as $$Mw = \frac{\sum_{i=1}^{\infty} NiMi^2}{\sum_{i=1}^{\infty} NiMi}$$

where each molecule contributes to Mw in proportion to the square of its respective mass.

Z average molecular weight (Mz) is the next higher molecular weight to Mw and is mathematically expressed as $$Mw = \frac{\sum_{i=1}^{\infty} NiMi^3}{\sum_{i=1}^{\infty} NiMi^2}$$

where each molecule contributes to Mz in proportion to the cube of its respective mass.

Measurement of Moisture Vapor Transmission Rate: Evaluation of the moisture vapor transmission rate (MVTR) performance of the films was made on a Mocon Permatran-W Model 3/33. Samples were tested in accordance with ASTM standard, F1249-05 Standard Test Method for Water Vapor Transmission Rate Through Plastic Film and Sheeting Using a Modulated Infrared Sensor, operated at 37.8° C. and 100% relative humidity. This standard can be found in the Annual Book of ASTM Standards 2005, Volume 15.09.

Measurement of Particle Size Distribution: The evaluation of particle size distribution (PSD) was performed via x-ray sedimentation technique using a Sedigraph 5100, in accordance with ISO standards 13317-1 General Principles and Guidelines, and 13317-3 X-Ray Gravitational techniques. Measurements using Sedigraph were made in the high speed analysis control mode using long flex life Tygon tubing. Sample were prepared in a 0.2% by weight sodium hexametaphosphate dispersant. A 5.0 gram sample was evaluated at 35° C. using an internal fixed-position X-ray source/detector. Sample starting/end point diameters measure 50-0.5 µm, respectively.

Equipment:

Extruder: Battenfeld Gloucester co-ex extrusion, 2" inside extruder, 3.5" core (middle) extruder, and a 2" outside extruder.

Layer Ratio: A (Inside)—30%, B (Core)—55%, and C (Outside)—15%

Screen Pack: 20/80/20 Mesh. Same pack configuration used in all three extruders

Die: 8" Battenfeld Gloucester w/ 80 mil die gap

Air Ring: Egan Davis-Standard dual-lip

Resins:

TABLE 1

| Resins | | | | | |
|---|---|---|---|---|---|
| Resin | Density | MI | Mn | Mw | Mz |
| Resin A | 0.962 | 1.0 | 8799 | 82314 | 331501 |
| Resin B | 0.962 | 6.5 | | | |
| Resin C | 0.962 | 8.0 | 9132 | 62247 | 203165 |
| Resin D | 0.962 | 8.0 | | | |

Density in g/cm$^3$,
MI = melt index (dg/min),
Mn = number average molecular weight,
Mw = weight average molecular weight,
Mz = z average molecular weight Resin D contains a fluoroelastomer polymer processing aid (a flow promoter) and showed poor response with respect to MVTR.

Calcium Carbonate Minerals:

TABLE 2

| Calcium Carbonate Minerals | | | | | |
|---|---|---|---|---|---|
| Calcium Carbonate (CC) type | Description | Median Particle Size (µm) | Top Cut-d98 (µm) | Surface Area (m$^2$/g) | Treatment Level |
| CCA | Finely divided marble wet ground at 70% solids in presence of sodium polyacrylate dispersant and dried and surface treated | 1.4 | 8 | 5.5 | 1.1% Wt. 2 mg/m$^2$ |
| CCB | Finely divided marble wet ground in absence of a dispersant at 20% solids and dried and surface treated | 2.0 | 10 | 3.3 | 0.8% Wt. 2.4 mg/m$^2$ |

Top Cut-d98 refers to the average diameter of calcium carbonate particles in the 98$^{th}$ mass percentile. Treatment level refers to surface treatment of CaCO$_3$ with stearic acid/palmitic acid blend.

Process:

Air Ring: Cooling temperature 52-54° F. with a 3.5 inch pressure (psig).

Frost Line: Height range—18 to 19 inches

Output Rate: Constant at 250#/hr.

Conditions: Combinations of Blowup Ratio (BUR) and gauge (thickness measured in mils)

TABLE 3

| Processing Conditions | | | |
|---|---|---|---|
| Conditions | BUR | LAYFLAT | Gauge |
| 1 | 1.60 | | 2.00 |
| 2 | | | 2.50 |
| 3 | 2.20 | | 2.00 |
| 4 | | | 2.50 |
| 5 | 1.60 | | 3.00 |
| 6 | 2.2 | | 3.00 |

BUR = Blow-Up Ratio.

Samples:

TABLE 4

| Samples | | | |
|---|---|---|---|
| Sample | Target % by weight CaCO$_3$ in film | CaCO$_3$ Masterbatch CaCO$_3$/Resin | Masterbatch Ratio Mineral/Resin |
| Control | 0 | — | — |
| Sample A | 20 | CCA/Resin B | 50/50 |
| Sample B | 25 | CCA/Resin B | 50/50 |
| Sample C | 30 | CCA/Resin B | 50/50 |
| Sample D | 25 | CCB/Resin C | 50/50 |
| Sample E | 25 | CCA/Resin C | 50/50 |
| Sample F | 25 | CCA/Resin D | 60/40 |
| Sample G | 25 | CCA/Resin B | 50/50 |
| Sample H | 25 | CCA/Resin B | 75/25 |

Description of Resin types and Calcium carbonate (CC) types in Masterbatch are found in Tables 1 and 2, respectively.

Trial Notes: Nine samples including a control and five different calcium carbonate masterbatches were extruded on a Gloucester Battenfeld coextrusion blown film line. Except for samples A and C, each of these samples was extruded at the four different conditions (2.0 and 2.5 gauge, and 1.6 and 2.2 blow up ratio). Samples A & C were processed only at the 2.5 mil gauge with the 1.6 and 2.2 blow up ratio, respectively. Conditions 5 and 6 (Table 3) were used for the controls only.

Results and Discussion

The evaluation objective was to determine which set of extrusion and calcium carbonate concentrate material combinations provided the highest resistance to moisture vapor transmission rate. It was demonstrated that a film constructed from Resin A with 25% by weight calcium carbonate incorporated via a 50/50 masterbatch of either Resin B or C (Table 1) with Calcium Carbonate (CC) type A (Table 2) provided the best improvements to MVTR when processed at the 1.6 blow up ratio and 2.5 mil gauge. Table 5A-C summarizes the film performance, including the moisture vapor transmission rate (MVTR) response. The codes in Table 5A-C for the Samples and Process Conditions are found in Tables 3 and 4.

The films described herein provide a cost efficient means, compared for example to the use of metallized films, of providing films with reduced MVTRs that can be used for packaging moisture-sensitive products such as dry foods.

TABLE 5A

Results of Film Performance (continued in Table 5B & 5C)

| SAMPLE & PROCESS CONDITION | | MB Loading % Wt | Resin Base for MB | CaCO₃ (CC) Type | CaCO₃ in Film % Wt | CaCO₃ in Film by Ash | BUR | Target mils | Measured mils | Basis Wt mils |
|---|---|---|---|---|---|---|---|---|---|---|
| Control | 1 | | | | 0 | 0.19 | 1.6 | 2 | 2.01 | 1.46 |
| Control | 2 | | | | 0 | 0.16 | 1.6 | 2.5 | 2.63 | 2.15 |
| Control | 3 | | | | 0 | 0.15 | 2.2 | 2 | 1.97 | 1.6 |
| Control | 4 | | | | 0 | 0.15 | 2.2 | 2.5 | 2.47 | 2.11 |
| Control | 5 | | | | 0 | 0.03 | 1.6 | 3 | 3.11 | 2.31 |
| Control | 6 | | | | 0 | 0.12 | 2.2 | 3 | 3.06 | 2.54 |
| A | 2 | 50 | B | CCA | 20 | 20.20 | 1.6 | 2.5 | 2.57 | 2.67 |
| A | 4 | 50 | B | CCA | 20 | 19.45 | 2.2 | 2.5 | 2.46 | 2.51 |
| B | 1 | 50 | B | CCA | 25 | 24.19 | 1.6 | 2 | 1.96 | 2.11 |
| B | 2 | 50 | B | CCA | 25 | 23.70 | 1.6 | 2.5 | 2.43 | 2.77 |
| B | 3 | 50 | B | CCA | 25 | 25.70 | 2.2 | 2 | 2.03 | 2.26 |
| B | 4 | 50 | B | CCA | 25 | 24.43 | 2.2 | 2.5 | 2.45 | 2.79 |
| C | 2 | 50 | B | CCA | 30 | 28.52 | 1.6 | 2.5 | 2.58 | 2.87 |
| C | 4 | 50 | B | CCA | 30 | 28.62 | 2.2 | 2.5 | 2.57 | 2.78 |
| D | 1 | 50 | C | CCB | 25 | 26.58 | 1.6 | 2 | 2.02 | 2.18 |
| D | 2 | 50 | C | CCB | 25 | 25.20 | 1.6 | 2.5 | 2.56 | 2.7 |
| D | 3 | 50 | C | CCB | 25 | 24.71 | 2.2 | 2 | 2.03 | 2.17 |
| D | 4 | 50 | C | CCB | 25 | 25.64 | 2.2 | 2.5 | 2.53 | 2.75 |
| E | 1 | 50 | C | CCA | 25 | 23.90 | 1.6 | 2 | 2.04 | 2.19 |
| E | 2 | 50 | C | CCA | 25 | 24.23 | 1.6 | 2.5 | 2.57 | 2.72 |
| E | 3 | 50 | C | CCA | 25 | 23.83 | 2.2 | 2 | 2.04 | 2.21 |
| E | 4 | 50 | C | CCA | 25 | 24.28 | 2.2 | 2.5 | 2.51 | 2.6 |
| F | 1 | 60 | D | CCA | 25 | 21.60 | 1.6 | 2 | 1.99 | 2.23 |
| F | 2 | 60 | D | CCA | 25 | 21.78 | 1.6 | 2.5 | 2.54 | 2.8 |
| F | 3 | 60 | D | CCA | 25 | 26.27 | 2.2 | 2 | 1.97 | 2.2 |
| F | 4 | 60 | D | CCA | 25 | 23.98 | 2.2 | 2.5 | 2.46 | 2.63 |
| G | 1 | 50 | B | CCA | 25 | 25.62 | 1.6 | 2 | 1.91 | 2.23 |
| G | 2 | 50 | B | CCA | 25 | 27.20 | 1.6 | 2.5 | 2.4 | 2.85 |
| G | 3 | 50 | B | CCA | 25 | 24.70 | 2.2 | 2 | 1.93 | 2.24 |
| G | 4 | 50 | B | CCA | 25 | 26.02 | 2.2 | 2.5 | 2.55 | 2.86 |
| H | 1 | 75 | B | CCA | 25 | 22.82 | 1.6 | 2 | 1.97 | 1.91 |
| H | 2 | 75 | B | CCA | 25 | 26.70 | 1.6 | 2.5 | 2.52 | 2.83 |
| H | 3 | 75 | B | CCA | 25 | 25.24 | 2.2 | 2 | 2.07 | 2.19 |
| H | 4 | 75 | B | CCA | 25 | 30.25 | 2.2 | 2.5 | 2.54 | 2.83 |

TABLE 5B

Results of Film Performance (continuation of Table 5A)

| SAMPLE & PROCESS CONDITION | | MVTR g/100 in²/d | nMVTR Measured g-mil/100 in²/d | nMVTR (2) Target g-mil/100 in²/d | Effect of CaCO₃ nMVTR % Improvement | Effect of BUR nMVTR % Improvement |
|---|---|---|---|---|---|---|
| Control | 1 | 0.177 | 0.356 | 0.354 | | |
| Control | 2 | 0.108 | 0.284 | 0.270 | | |
| Control | 3 | 0.132 | 0.260 | 0.264 | | 26.91 |
| Control | 4 | 0.097 | 0.240 | 0.243 | | 8.45 |
| Control | 5 | 0.094 | 0.292 | 0.282 | | |
| Control | 6 | 0.075 | 0.230 | 0.225 | | |
| A | 2 | 0.1 | 0.257 | 0.250 | 9.52 | |
| A | 4 | 0.092 | 0.226 | 0.230 | 12.97 | 11.94 |
| B | 1 | 0.135 | 0.265 | 0.270 | 25.63 | |
| B | 2 | 0.091 | 0.221 | 0.228 | 22.15 | |
| B | 3 | 0.107 | 0.217 | 0.214 | 16.47 | 17.91 |
| B | 4 | 0.087 | 0.213 | 0.218 | 18.03 | 3.61 |
| C | 2 | 0.095 | 0.245 | 0.238 | 13.71 | |
| C | 4 | 0.097 | 0.249 | 0.243 | 4.13 | −1.71 |
| D | 1 | 0.123 | 0.248 | 0.246 | 30.16 | |
| D | 2 | 0.095 | 0.243 | 0.238 | 14.38 | |
| D | 3 | 0.115 | 0.233 | 0.230 | 10.23 | 6.04 |
| D | 4 | 0.092 | 0.233 | 0.230 | 10.49 | 4.29 |
| E | 1 | 0.139 | 0.284 | 0.278 | 20.30 | |
| E | 2 | 0.096 | 0.247 | 0.240 | 13.14 | |
| E | 3 | 0.118 | 0.241 | 0.236 | 7.43 | 15.11 |
| E | 4 | 0.097 | 0.243 | 0.243 | 6.37 | 1.32 |
| F | 1 | 0.161 | 0.320 | 0.322 | 9.94 | |
| F | 2 | 0.115 | 0.292 | 0.288 | −2.84 | |
| F | 3 | 0.134 | 0.264 | 0.268 | −1.52 | 17.61 |
| F | 4 | 0.104 | 0.256 | 0.260 | 1.62 | 12.41 |
| G | 1 | 0.135 | 0.258 | 0.270 | 27.52 | |
| G | 2 | 0.095 | 0.228 | 0.238 | 19.73 | |
| G | 3 | 0.115 | 0.222 | 0.230 | 14.65 | 13.92 |
| G | 4 | 0.089 | 0.227 | 0.223 | 12.72 | 0.46 |
| H | 1 | 0.195 | 0.384 | 0.390 | −7.98 | |
| H | 2 | 0.121 | 0.305 | 0.303 | −7.35 | |
| H | 3 | 0.129 | 0.267 | 0.258 | −2.69 | 30.49 |
| H | 4 | 0.091 | 0.231 | 0.228 | 11.11 | 24.20 |

TABLE 5C

Results of Film Performance (continuation of Table 5A & 5B)

| SAMPLE & PROCESS CONDITION | | 2.5 mil CACO₃ Containing HDPE film vs. 3.0 HDPE Film nMVTR % Improvement | Average nMVTR Improvement % Improvement | Average nMVTR Improvement % Improvement |
|---|---|---|---|---|
| Control | 1 | | | |
| Control | 2 | | | |
| Control | 3 | | | |
| Control | 4 | | | |
| Control | 5 | | | |
| Control | 6 | | | |
| A | 2 | | | 11.24 |
| A | 4 | | | |
| B | 1 | | 23.89 | 20.57 |
| B | 2 | 24.36 | | |
| B | 3 | | 17.25 | |
| B | 4 | 7.12 | | |
| C | 2 | 16.16 | | 8.92 |
| C | 4 | −8.62 | | |
| D | 1 | | 22.27 | 16.31 |
| D | 2 | 16.81 | | |
| D | 3 | | 10.36 | |
| D | 4 | −1.42 | | |
| E | 1 | | 16.72 | 11.81 |
| E | 2 | 15.61 | | |
| E | 3 | | 6.90 | |
| E | 4 | −6.09 | | |
| F | 1 | | 3.55 | 1.80 |
| F | 2 | 0.08 | | |
| F | 3 | | 0.05 | |
| F | 4 | −11.48 | | |
| G | 1 | | 23.63 | 18.66 |
| G | 2 | 22.01 | | |
| G | 3 | | 13.69 | |
| G | 4 | 1.11 | | |
| H | 1 | | −7.66 | −1.73 |
| H | 2 | −4.30 | | |
| H | 3 | | 4.21 | |
| H | 4 | −0.71 | | |

Notes to Table 5B: "MVTR" is the raw MVTR. "nMVTR" is the MVTR corrected using measured gauge. "nMVTR(2)" is the MVTR corrected using target gauge. "Effect of CaCO₃" shows improvement in MVTR (measured gauge corrected) versus control film at same gauge and film orientation (BUR). "Effect of BUR" shows improvement in MVTR resulting from BUR at equivalent CaCO₃ loading and gauge. Positive numbers indicates an improvement (i.e., reduced MVTR); negative number indicates a deficiency.

Notes to Table 5C: Comparison in Column 3 is between a 2.5 mil film containing CaCO₃ versus a straight 3.0 mil HDPE at equivalent BUR. "Average nMVTR Improvement" in Column 4 is the average improvement in MVTR of CaCO₃ containing samples versus control at a given BUR. "Average nMVTR Improvement" in Column 5 is the average improvement in nMVTR of CaCO₃ containing samples versus the control across both gauges and BURs used. Positive numbers indicates an improvement (i.e., reduced MVTR); negative number indicates a deficiency.

REFERENCES

PCT International Publication No. WO 02/10275 A2, published Feb. 7, 2002, Eastman Chemical Company.
PCT International Publication No. WO 03/020513 A1, published Mar. 13, 2003, Kimberly-Clark Worldwide, Inc.
PCT International Publication No. WO 03/031134 A1, published Apr. 17, 2003, Imerys Minerals Limited.
U.S. Patent Application Publication No. 2004/0105942 A1, published Jun. 3, 2004.
U.S. Pat. No. 4,183,893, issued Jan. 15, 1980.
U.S. Pat. No. 4,870,122, issued Sep. 26, 1989.
U.S. Pat. No. 6,391,411 B1, issued May 21, 2002.

What is claimed is:

1. A multilayer film for packaging a moisture-sensitive material, wherein the multilayer film consists of an inner layer, an outer layer and a core layer, wherein the core layer and the outer layer each comprises:
   a) a medium molecular weight high density polyethylene (MMW-HDPE) base resin; and
   b) a MMW-HDPE carrier resin admixed with natural ground $CaCO_3$;
   wherein the base resin and the carrier resin differ in molecular weight, density, melt index and/or polydispersity index, wherein the $CaCO_3$ and the carrier resin are present in a ratio of 15/85 to 80/20 by weight, wherein the $CaCO_3$ is present in the multilayer film in a total concentration of 20-35% by weight, wherein the $CaCO_3$ is contained in the outer and core layers and not in the inner layer, wherein the multilayer film has a moisture vapor transmission rate (MVTR) that is reduced by 10-30% in comparison to the film in the absence of $CaCO_3$, wherein the multilayer film is a moisture-sensitive material packaging film, wherein the $CaCO_3$ has a median particle size of 0.7-2.5 μm and a top cut d98 of 4-15 μm, and wherein the $CaCO_3$ is treated with 0.3 to 2.3% by weight of a surface treatment agent selected from the group consisting of one or more fatty acids having 8 to 24 carbon atoms.

2. The multilayer film of claim 1, wherein the carrier resin has a melt index of 4-10 dg/min.

3. The multilayer film of claim 1, wherein the carrier resin has a density of 0.958-0.963 g/cm³.

4. The multilayer film of claim 1, wherein the base resin has a melt index of 0.05-2.0 dg/min.

5. The multilayer film of claim 1, wherein the base resin has a density of 0.958-0.963 g/cm³.

6. The multilayer film of claim 1, wherein the base resin has a melt index of 0.05-2.0 dg/min and a density of 0.958-0.963 g/cm³, and the carrier resin has a melt index of 4-10 dg/min and a density of 0.958-0.963 g/cm³.

7. The multilayer film of claim 1, wherein the carrier resin has a melt index of 6.5-8.0 dg/min.

8. The multilayer film of claim 1, wherein the carrier resin has a melt index of 6.5 dg/min.

9. The multilayer film of claim 1, wherein the carrier resin has a density of 0.962 g/cm³.

10. The multilayer film of claim 1, wherein the base resin has a melt index of 1 dg/min.

11. The multilayer film of claim 1, wherein the base resin has a density of 0.962 g/cm³.

12. The multilayer film of claim 1, wherein the concentration of $CaCO_3$ in the multilayer film is 20-30% by weight.

13. The multilayer film of claim 1, wherein the concentration of $CaCO_3$ in the multilayer film is 25% by weight.

14. The multilayer film of claim 1, wherein the $CaCO_3$ and the carrier resin are present in a ratio of 40/60 to 80/20 by weight.

15. The multilayer film of claim 1, wherein the $CaCO_3$ and the carrier resin are present in a ratio of 40/60 to 60/40 by weight.

16. The multilayer film of claim 1, wherein the $CaCO_3$ and the carrier resin are present in a ratio of 45/55 to 55/45 by weight.

17. The multilayer film of claim 1, wherein the $CaCO_3$/carrier resin ratio is 50/50 by weight.

18. The multilayer film of claim 1, wherein the carrier resin has a melt index of 0.85 to 1.5 dg/min.

19. The multilayer film of claim 1, wherein the base resin has a melt index of 0.85 to 1.5 dg/min.

20. The multilayer film of claim 1, wherein the base resin has a melt index of 0.05-2.0 dg/min and a density of 0.958-0.963 g/cm$^3$, and the carrier resin has a melt index of 4-10 dg/min and a density of 0.958-0.963 g/cm$^3$, and wherein the CaCO$_3$ has a median particle size of 1.4-2.0 µm, a top cut d98 of 8-10 µm, and a surface area of 3.3-10.0 m$^2$/g.

21. The multilayer film of claim 1, having a moisture vapor transmission rate (MVTR) that is reduced by 20-30% in comparison to the film in the absence of CaCO$_3$.

22. The multilayer film according to claim 1, obtained by coextrusion of the inner layer, outer layer and core layer.

23. The multilayer film according to claim 1, wherein the inner layer comprises one or more of ethylene vinyl acetate (EVA), ethylene ethyl acetate (EEA), and ethylene acrylic acid (EAA).

24. The multilayer film according to claim 1, wherein the inner layer comprises ethylene vinyl acetate (EVA).

25. The multilayer film according to claim 1, in combination with a moisture sensitive material contained therein.

26. The multilayer film according to claim 1, wherein the one or more fatty acids having 8 to 24 carbon atoms is one or more of arachidic acid, behenic acid, capric acid, cerotic acid, isostearic acid, lauric acid, myristic acid, montanic acid, palmitic acid or stearic acid.

27. The multilayer film according to claim 1, wherein the one or more fatty acids having 8 to 24 carbon atoms is one or more of palmitic acid or stearic acid.

28. The multilayer film according to claim 1, wherein the one or more fatty acids having 8 to 24 carbon atoms is stearic acid.

29. A packaging material comprising the film of claim 1.

30. A multilayer film consisting of an inner layer, an outer layer and a core layer, wherein the core layer and the outer layer each comprises:
   a) a medium molecular weight high density polyethylene (MMW-HDPE) base resin; and
   b) a MMW-HDPE carrier resin admixed with natural ground CaCO$_3$;
   wherein the base resin and the carrier resin differ in molecular weight, density, melt index and/or polydispersity index, wherein the CaCO$_3$ and the carrier resin are present in a ratio of 15/85 to 80/20 by weight, wherein the CaCO$_3$ is present in the multilayer film in a total concentration of 20-35% by weight, wherein the CaCO$_3$ is contained in the outer and core layers and not in the inner layer, and wherein the multilayer film has a moisture vapor transmission rate (MVTR) that is reduced by 10-30% in comparison to the film in the absence of CaCO$_3$, wherein the CaCO$_3$ has a median particle size of 0.7-2.5 µm and a top cut d98 of 4-15 µm, and wherein the CaCO$_3$ is treated with 0.3 to 2.3% by weight of a surface treatment agent selected from the group consisting of one or more fatty acids having 8 to 24 carbon atoms.

* * * * *